Figure 3:
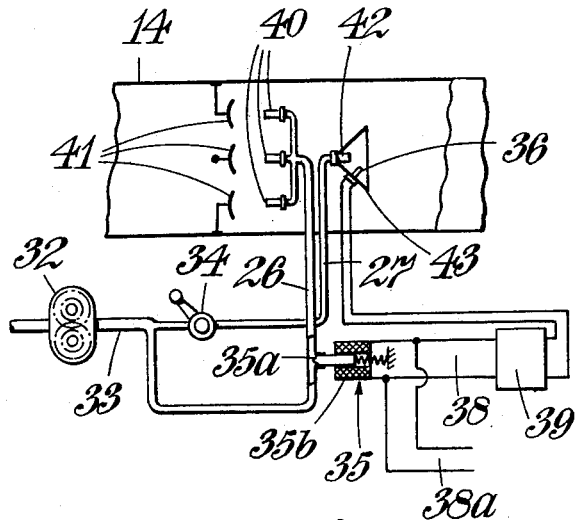

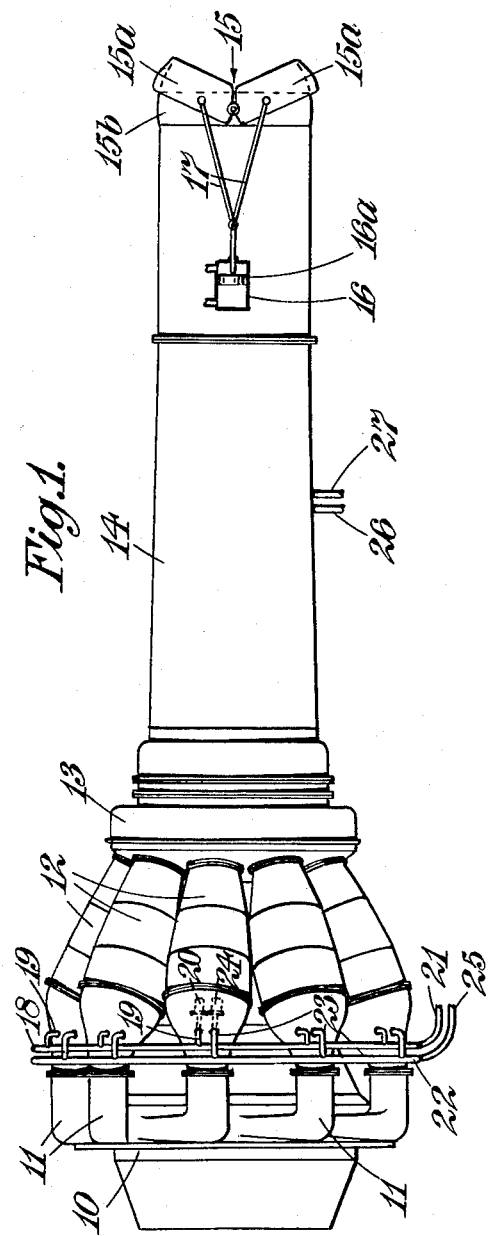

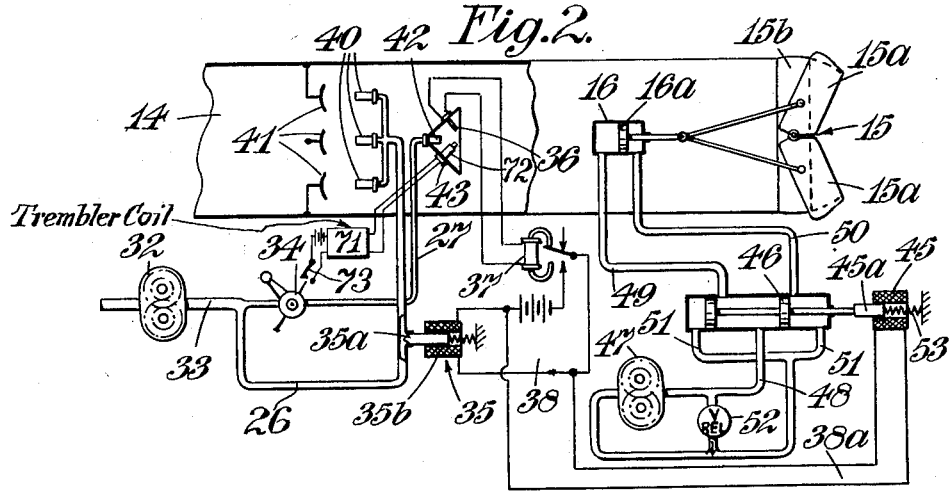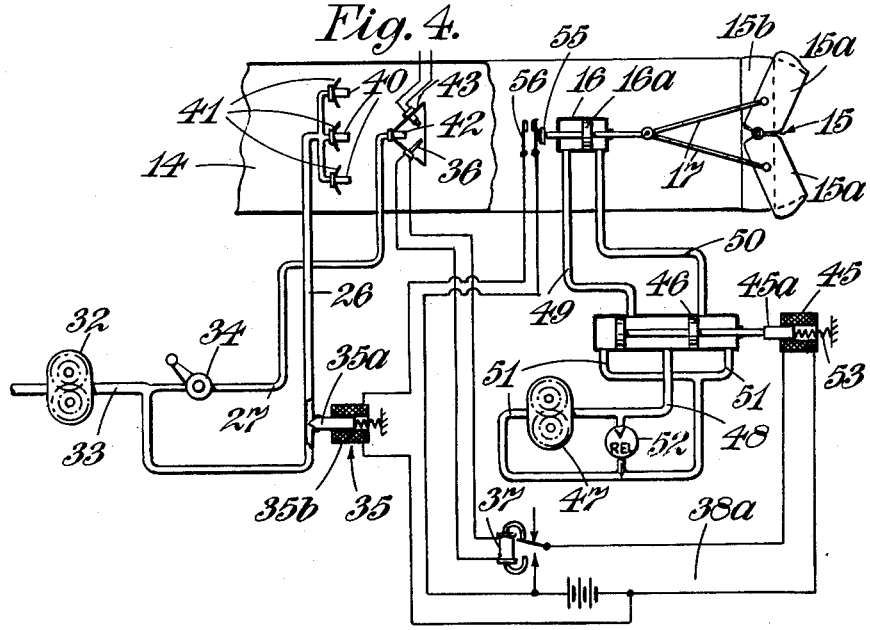

INVENTORS
A. JUBB +
W. R. C. IVENS
By Wilkinson + Mawhinney

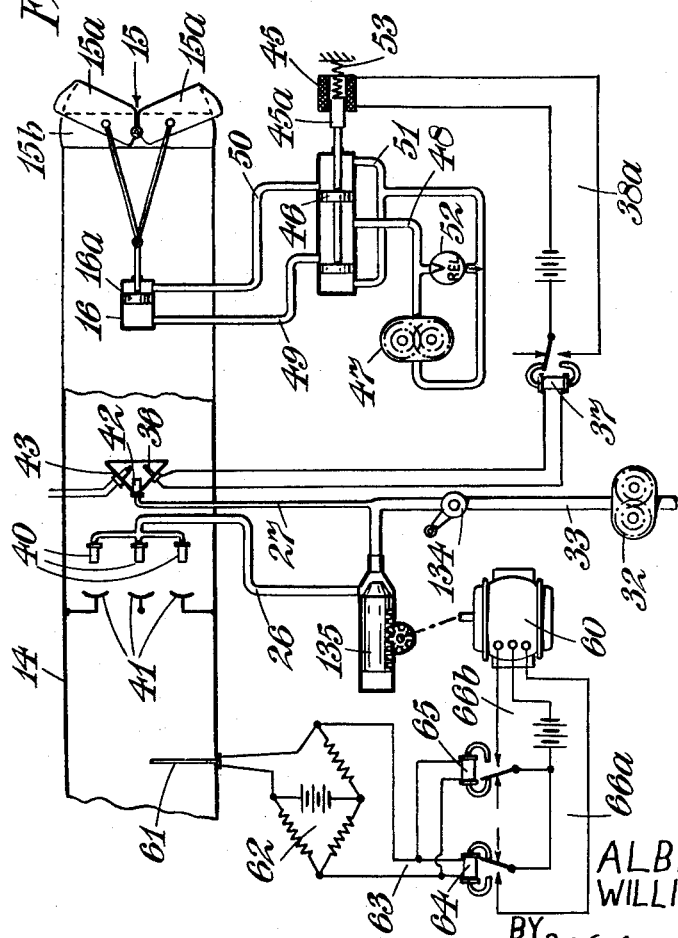

United States Patent Office 2,722,800
Patented Nov. 8, 1955

2,722,800

FUEL SYSTEMS FOR GAS TURBINE ENGINES OR THE LIKE WITH MAIN AND PILOT FUEL INJECTORS

Albert Jubb, Buttershaw, Bradford, and William Ralph Coleman Ivens, Derby, England, assignors to Rolls-Royce Limited, Derby, England, a British company Application February 13, 1950, Serial No. 143,932

Claims priority, application Great Britain February 21, 1949

10 Claims. (Cl. 60—35.6)

This invention relates to fuel systems of gas-turbine engines, and is concerned with the control of the fuel supply to multiple fuel injector systems in the combustion equipment of such engines.

The invention is applicable to auxiliary combustion equipment such as is used for heating exhaust gas from a turbine system, which exhaust gas when heated by such auxiliary combustion equipment passes to atmosphere through a jet nozzle, the propulsive thrust obtained from the jet being augmented by the heating effected in the auxiliary combustion equipment.

According to the present invention, there is provided in a gas-turbine engine which comprises a jet pipe and combustion equipment in said jet pipe for reheating exhaust gas, a fuel system for supplying fuel to said combustion equipment having at least one main fuel injector and a pilot fuel injector arranged so that burning of the fuel delivered through the pilot fuel injector ignites the fuel from the main fuel injector, temperature-sensitive means located to be subjected to the temperature rise due to burning of fuel delivered by the pilot injector, a variable-area jet-nozzle, and means to increase the area of said jet-nozzle on sensing by said temperature-sensitive means of a temperature rise due to burning of fuel delivered by the pilot injector.

Adoption of the invention assures that the jet-nozzle area is appropriately increased when said temperature-sensitive means is subjected to an elevated temperature arising from burning of fuel delivered by the pilot injector, and thus only when there is a flame available to ignite the main fuel supply.

The invention has an important application in auxiliary combustion equipment for heating exhaust gas from a turbine system, where it is desirable to ensure that fuel is not supplied through the main injectors into the auxiliary combustion equipment unless ignition thereof can be ensured. Difficulties which have been experienced in igniting fuel introduced into a high velocity gas stream, such as usually exists in auxiliary combustion equipment, are avoided by arranging in accordance with this invention that the main fuel can only be supplied to the auxiliary combustion equipment when ignition of fuel delivered by the pilot jet has been effected.

The temperature-sensitive means may therefore be arranged also directly to control the delivery of fuel to the main injectors, for example, by effecting, on sensing of the temperature rise, the opening of a control valve in a fuel pipeline to the main injector or injectors through a suitable mechanism.

Alternatively, it is preferred to arrange that the fuel supply to the main injector or injectors be dependent upon the nozzle opening operation related to the use of the auxiliary equipment, which operation is initiated under control of the temperature-sensitive means on sensing of the temperature rise due to combustion of the pilot fuel.

For example, when auxiliary combustion equipment is employed in a reaction-propulsion aircraft engine for augmenting the jet thrust, the bringing into operation of the auxiliary combustion equipment necessitates the use of an increased reaction jet-nozzle area, and a future feature of the invention therefore comprises arranging that the temperature-sensitive means, upon sensing the temperature rise due to combustion of fuel delivered by the pilot fuel injector, initiates the operation of increasing the nozzle area of a variable-area jet nozzle, and that the operation of increasing the jet nozzle area controls the delivery of fuel to the main fuel injector or injectors.

In one particular arrangement of such a system, the rate of fuel delivery to the main injectors is controlled as described in the United States Patent No. 2,674,843 in accordance with further temperature-sensitive means, so as to maintain a predetermined temperature of gas passing through the turbine, such temperature-sensitive means being situated on the upstream side of the auxiliary combustion equipment. Thus as a result of the operation of increasing the jet nozzle area the temperature sensed by this additional temperature-sensitive means is reduced, and accordingly the fuel supply to main injector or injectors is increased to stabilize the temperature sensed by the additional temperaure means at a selected value.

The temperature-sensitive means used in systems according to the invention may comprise a thermocouple or electrical resistance element, or a device operating on change of a physical state arising from temperature rise, such for example, as a device comprising a quartz or equivalent rod arranged to control the main fuel supply by its expansion on increase of temperature, or as a device comprising a liquid which changes to a gas at a predetermined temperature, thereby altering an electrical characteristic of the device.

A thermocouple or resistance element may be associated with an electrical amplifier to produce a suitable electromotive power for effecting movement of valve means controlling the fuel supply to the main injectors; or the power output from a thermocouple may be used directly to effect switching on an electrical power source by means of a relay such for example as a polarized relay; when using a device comprising a quartz rod or the like, the device may be arranged mechanically to effect direct switching of an electrical power source.

Fuel injectors used in fuel systems according to the invention may be of any suitable type, such as atomizing injectors or fuel vaporizing injectors, and may introduce the fuel either in an upstream or downstream direction relative to the general flow of gas through the combustion equipment. In certain cases the pilot and main injectors may be of differing kinds: thus a pilot injector of the fuel atomizing kind may be used in combination with main injectors of the fuel vaporizing kind, the heat release of the pilot injector, in addition to igniting the main fuel, serving to heat vaporizing tubes of the main fuel injectors.

Figure 6:
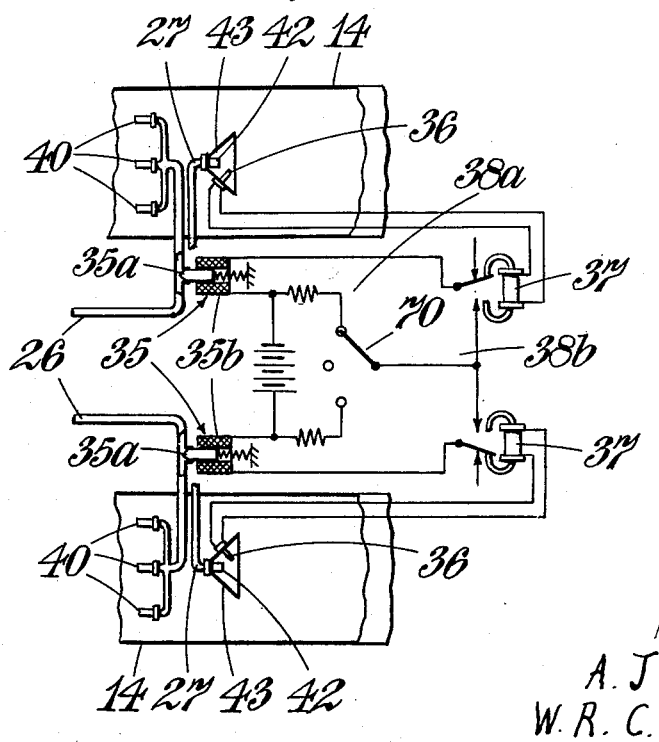

Some arrangements according to this invention will now be described with reference to the accompanying drawings in which:

Figure 1 illustrates an aircraft gas-turbine engine of a class in which fuel may be burnt in the jet pipe to augment the thrust obtained from the propulsive jet, Figure 2 illustrates one application of the invention to controlling the fuel supply to auxiliary combustion equipment formed by a jet pipe of a gas-turbine engine, Figure 3 illustrates a modification of part of the arrangement according to Figure 2, Figure 4 illustrates a modification of the arrangement shown in Figure 2, Figure 5 illustrates another fuel control arrangement according to this invention, and Figure 6 illustrates yet another fuel control arrangement according to this invention.

In all the figures of the drawings the same reference numerals are used to indicate the same equivalent parts.

Referring to Figure 1, there is illustrated a jet-propulsion gas-turbine engine suitable for use with aircraft, and the engine comprises a compressor 10 arranged to deliver compressed air through delivery necks 11 into a series of combustion chambers 12 which are connected at their outlet ends with a turbine 13. The turbine rotor is connected with the compressor rotor to drive it by a shaft (not shown) and the combustion chambers 12 are disposed in a ring around the shaft.

The exhaust gases from the turbine 13 flow into a jet pipe 14 having at its outlet end a variable area jet nozzle 15 conveniently comprising a pair of adjustable segments 15a arranged to pivot on a fixed portion 15b of the nozzle under control of a hydraulic ram 16 to which the segments 15a are connected by links 17, so that in the position shown the segments 15a define the minimum area of the jet nozzle and so that on retraction of the segments 15a the nozzle area is increased.

With such an engine under normal running conditions, fuel is supplied only to the main combustion equipment formed by combustion chambers 12. The fuel supply to the main combustion chambers 12 is effected from a pilot fuel manifold 18 having a series of branches 19 leading to pilot fuel injectors 20, the manifold being fed with fuel from a supply pipe 21, and also from a main fuel manifold 22 having a series of branches 23 leading to main fuel injectors 24, the manifold 22 being supplied with fuel through a supply pipe 25. The main and pilot fuel injectors 24, 20 may be any convenient form, for example they may be atomizing fuel injectors or vaporizing fuel injectors, and the arrangement is such that the fuel delivered into the combustion chambers 12 by the pilot injectors 20 is ignited to produce a flame which is employed to ignite the fuel being supplied to the combustion chambers 12 by the main fuel injectors 24. Under normal running conditions the segments 15a of the nozzle 15 are in the position illustrated in the drawings, that is, in the minimum nozzle area position.

Under certain conditions it is desirable to augment the thrust obtained from the exhaust jet and under these conditions fuel is burnt in the jet pipe. The fuel supply to the jet pipe is also fed through a pilot and main fuel injector arrangement, such for example as illustrated in Figure 2, the flame produced by burning the fuel delivered to the pilot injectors being used to ignite the fuel from the main injectors. In Figure 1 the main fuel supply pipe to the injectors in the jet pipe 14 is indicated at 26 and the pilot fuel supply pipe at 27. When fuel is being burnt in the jet pipe 14 the segments 15a of the variable area jet nozzle 15 are retracted to the maximum nozzle area position.

Referring now to Figure 2, there is illustrated one application of the invention to supplying fuel to be burnt in the jet pipe of a gas-turbine engine such as the jet pipe 14 of the gas-turbine engine shown in Figure 1. In Figure 2, the jet pipe is indicated at 14 and the fuel supply arrangement comprises a plurality of main fuel injectors 40 supplied with fuel from the supply pipe 26 (see also Figure 1), the injectors 40 being arranged to deliver fuel in a direction upstream of the exhaust gas flow through the jet pipe 14. A series of baffles 41 are supported within the jet pipe in line with the burners 40 to provide stagnant zones in which the fuel delivered into the jet pipe 14 by the main injectors 40 is intimately mixed with the exhaust gases. Fuel is also delivered to the jet pipe through a pilot injector 42 fed from a supply pipe 27 (see also Figure 1) and the pilot injector 42 is arranged to deliver fuel in a downstream direction of the exhaust gas flow through the jet pipe 14. A baffle 43 is carried by the pilot fuel injector 42 to provide a stagnant zone into which the pilot fuel is delivered. The gas velocity in the stagnant zone behind baffle 43 is substantially below that of the exhaust gas flow through the jet pipe 14 and thus ignition of the pilot fuel by the normal ignition devices such as a spark plug is facilitated.

The fuel for delivery to the main injectors 40 and the pilot injector 42 is supplied by a common pump 32 having a delivery pipe 33 to which the main fuel supply pipe 26 and the pilot supply pipe 27 are connected. A control valve 34 is provided in the pilot fuel supply pipe, which valve 34 may be arranged to be opened on switching on of the power supply to the ignition device, and the delivery of fuel through the main fuel supply pipe is controlled by a solenoid-operated valve 35.

A temperature-sensitive device, for example a thermocouple 36, is provided to control the opening and closing of the solenoid-operated valve 35 through a polarized relay 37.

The temperature-sensitive device 36 is mounted on the baffle 43 to project into the stagnant zone behind it and thus the temperature-sensitive device 36 will be sensitive to rise in temperature due to burning of the fuel delivered by the pilot fuel injector 42. When the temperature-sensitive device 36 senses a rise in temperature due to burning of fuel from the pilot injector 42, the polarized relay 37 is operated to complete the circuit through the coil 35b of the solenoid-operated valve 35 so withdrawing the valve element 35a and initiating the fuel supply to the main fuel injectors 40. The fuel from the main fuel injectors mixes intimately with the exhaust gases and is carried downstream in the exhaust gas past the baffle 43 and part of the man fuel is carried into the stagnant zone behind the baffle 43 and is there ignited by the flame from the pilot injector 42. The combustion of the main fuel then spreads to the remainder of the fuel entrained in the exhaust gas and combustion is completed prior to the exhaust gases reaching the jet nozzle 15.

Instead of the temperature-sensitive device 36 controlling the solenoid-operated valve 35 through the polarized relay 37 an arrangement such as is illustrated in Figure 3 can be employed.

In this arrangement, the thermocouple 36 may be connected to an electrical device 39 in which a comparison is made between the output of the thermocouple or thermocouples and a standard voltage and which is arranged when the output reaches a selected value to operate an amplifier controlling the supply of current to the coil 35b of the solenoid device 35 through the circuit 38.

Means of any known or convenient kind will be provided for igniting the pilot fuel supply and such means may comprise, for example, a high tension trembler coil 71 connected with a spark plug device 72, across the spark gap of which the pilot injectors 42 spray fuel. The switch 73 for energizing the trembler coil may be connected with the valve 34 controlling the supply of fuel to the pilot injector so that the trembler coil is energized at the same time as the supply to the pilot injector is effected.

It is usual in the operation of gas-turbine engines in which fuel is burnt in the jet pipe to increase the effective area of the jet nozzle 15 when fuel is being burnt in the jet pipe as compared with the area when fuel is not being burnt in the jet pipe, and in order to avoid excessive temperatures in the turbine it is desirable to ensure that the nozzle area is increased when the supply of fuel to the fuel injectors 40 is initiated. For this purpose according to this invention, it is arranged that the operation of increasing the effective area of the jet nozzle 15 is also controlled by the temperature-sensitive device which is sensitive to burning of fuel from the pilot injector 42.

In the arrangement illustrated in Figure 2, the effective area of the jet nozzle is controlled by adjustable segments 15a, as described with reference to Figure 1, and the supply of pressure fluid to the ram 16 is controlled by a solenoid 45 arranged to be energized at the same time as the coil 35b of the solenoid-operated valve 35.

The solenoid 45 is connected by leads 38a to the circuit 38 in parallel with the coil 35b of the solenoid-operated valve 35, so that current is supplied to the solenoid 35 when the polarized relay 37 is operated by the temperature-sensitive device 36. The armature 45a of the solenoid operates a piston valve 46 controlling the flow of pressure fluid to ram 16 from a pump 47 delivering through a pipeline 48 to the piston valve mechanism which is connected by pipelines 49 and 50 to the respective ends of the ram 16 controlling the operation of the rocking segments 15a. Return pipelines 51 are provided to the inlet side of the pump 47 to permit the return of pressure fluid from the ram to the inlet of the pump 47. A relief valve 52 is provided between the pipeline 48 and the pipelines 51.

When the solenoid 45 is de-energized the piston valve 46 is urged by a spring 53 into a position in which the pipeline 49 is connected with the pressure fluid supply line 48, so that the piston 16a of the ram 16 is at the right hand end of its travel, as viewed in the drawings, and the segments are in the full line position corresponding to the minimum effective area of the jet nozzle 15.

On energization of the solenoid 45 simultaneously with the energization of the coil 35b of the solenoid-operated valve 35, the piston valve 46 is moved to the right, as viewed in the drawing, and the pipeline 50 is connected with the pressure fluid supply pipe 48. The piston 16a of the ram 16 thus moves to the left, as viewed in the drawings, retracting the rocking segments 15a and increasing the effective area of the nozzle 15.

Referring now to Figure 4, there is illustrated an arrangement similar to that described with reference to Figure 2. In this arrangement, however, the main fuel injectors 40 are shown as injecting fuel in a downstream direction, and a control arrangement is shown for supplying fuel to the main injectors 40 which is dependent upon the operation of increasing the effective area of nozzle 15 under control of the temperature-sensitive device 36. A series of baffles 41 are supported in the jet pipe adjacent the injectors 40 to provide stagnant zones in which the fuel delivered by the injectors is intimately mixed with the exhaust gases.

In this arrangement, on the temperature-sensitive device 36 sensing a rise in temperature, due to combustion of fuel delivered into the jet pipe 14 by the pilot injector 42, the polarised relay 37 is operated as before and completes a circuit 38a comprising the solenoid 45 through which the supply of pressure fluid to the ram 16 is controlled. On energization of the solenoid 45 the piston 16a of the ram moves to the left, as viewed in the drawings, and in this movement a tappet 55 carried on the ram piston 16a closes a pair of contacts 56 connected in a circuit comprising the contacts 56 and the coil 35b of the solenoid-operated valve 35. With this arrangement therefore, the valve element 35a of the solenoid-controlled valve 35 cannot be withdrawn to permit a supply of fuel to the main fuel injectors 40 until the ram piston 16a has moved to the left, as viewed in the drawings, to retract the segments 15a and thus increase the effective area of the nozzle 15. Thus, with this arrangement not only is the supply of fuel to the main fuel injectors 40 prevented until its ignition is assured by the existence of a flame from the pilot injector 42, but the supply of fuel to the main fuel injectors 40 is prevented until the jet nozzle 15 has an effective area appropriate to the burning of fuel in the jet pipe 14.

In another arrangement, the temperature-sensitive device, which senses a rise of temperature due to burning of fuel delivered by the pilot injector 42, may be arranged to control the retraction of the swinging segments 15a of the variable area jet nozzle 15 as above described and the supply of fuel to the main injectors may be made dependent upon the sensing of a reduction of temperature arising in the jet pipe due to opening of the nozzle. Thus, for instance, the fuel supply to the main fuel injectors 40 may be controlled in such a manner as to maintain a pre-selected temperature of exhaust gas immediately downstream of the turbine and upstream of the main fuel injectors 40.

Referring to Figure 5, one such arrangement is illustrated. In this arrangement there is shown a jet-pipe 14 having a variable-area jet-nozzle 15 and main fuel injectors 40 and a pilot fuel injector 42 for supplying fuel to the jet-pipe to heat the exhaust gas flowing therethrough, the arrangement of its parts being as described with reference to Figure 2.

Also as described with reference to Figure 2, fuel is delivered to the injectors 40, 42 from a fuel pump 32 thruogh branch pipes 26, 27 respectively. A control valve 134 is provided in the delivery pipe 33 from the pump 32 and opening of the control valve 134 permits the supply of fuel to the pilot injector 42, the supply to the main fuel injectors 40 being prevented by a throttle device 135 which is closed.

Also as shown in Figure 2, the jet-nozzle 15 comprises swinging segments 15a movement of which is controlled by a ram 16 supplied with pressure operating fluid from a pump 47 under control of a piston valve 46 which is arranged to be actuated by a solenoid device 45, the armature 45a of which is connected to an extension of the piston valve 46.

Also as shown in Figure 2, there is provided a temperature-sensitive device 36 such as a thermocouple arranged so as to be sensitive to burning of fuel delivered by the pilot fuel injector 42, and the temperature-sensitive device 36 is arranged to operate a polarized relay 37.

As described with reference to Figure 3, the polarized relay 37 is arranged to control the supply of current through a circuit 38a to the solenoid device 45, the arrangement being that when the temperature-sensitive device 36 senses a rise in temperature due to burning of fuel delivered by the pilot fuel injector 42, the relay 37 is energized to permit the supply of current to the coil of the solenoid device 45 thereby to move the piston valve 46 to the right as seen in the drawing, permitting the supply of pressure fluid to the ram 16 to retract the swinging segments 15a and to increase the effective area of the jet-nozzle 15.

In the arrangement shown in Figure 5, the supply of fuel to the main fuel injectors 40 through the supply pipe 26 is controlled by the throttle valve 135 which is arranged to be adjusted by a reversible electric motor 60.

The supply of current to the reversible motor 60 is controlled in the following manner. A temperature-sensitive device, illustrated as a resistance thermometer 61, is located in the jet-pipe 14 upstream of the main fuel injectors 40. The resistance thermometer 61 is connected in a bridge circuit 62 to form one arm thereof and the output from the bridge circuit is fed through leads 63 to a pair of polarized relays 64, 65 connected in parallel with one another and arranged so that when the bridge circuit is out of balance in one direction the relay 64 is operated and that when the bridge circuit is out of balance in the opposite direction relay 65 is operated. The bridge circuit 62 is adjusted so that when the temperature of the exhaust gases sensed by the resistance thermometer 61 has a selected value the bridge circuit is balanced so that there is no output. When the temperature sensed by the resistance thermometer 61 falls below the selected value, as for example will occur when the segments 15a are retracted to increase the effective area of the nozzle 15, the relay 64 will be energized to complete a circuit 66a to supply current to the electric motor to rotate it in a direction to open the throttle 135. When the temperature sensed by the resistance thermometer 61 is above the value at which the bridge circuit is balanced, the relay 65 is energized to close a circuit 66b permitting the supply of current to the motor 60 to rotate it in the reverse direction to close off the throttle 135.

It will thus be seen that the temperature-sensitive device 61 operates to maintain a preselected temperature in the jet-pipe upstream of the main fuel injectors 40.

In operation, on opening the control valve 134 fuel is first supplied to the pilot fuel injector 42. When the supply of fuel from the pilot injector 42 is ignited the temperature-sensitive device 36 operates the relay 37 so that the solenoid device 45 is energized and pressure fluid supplied to the ram 16 to retract the swinging segments 15a to increase the effective area of the nozzle.

Retraction of the swinging segments 15a causes a decrease in the temperature in the jet-pipe 14 at the location of the temperature-sensitive device 61 so that the bridge circuit 62 is unbalanced and the relay 64 energized. Energization of the relay 64 causes the supply of current through circuit 66a to the motor 60 and the throttle valve 135 is opened to permit the flow of fuel to the main fuel injectors 40. The fuel injected into the jet-pipe through the main fuel injectors 40 is intimately mixed with the exhaust gas and carried downstream where it is ignited by the flame from the pilot injector 42. Opening of the throttle 135 continues until the temperature sensed by the temperature-sensitive device 61 reaches the pre-selected value.

Once combustion of fuel from the main fuel injectors 40 has been initiated, the temperature-sensitive device 61 operates to maintain a preselected temperature of the exhaust gas in the jet-pipe at the location of the temperature-sensitive device by suitable adjustment of the throttle 135 through the bridge circuit 62, relays 64, 65 and motor 60.

It will be appreciated that with the arrangement shown in Figure 5, neither an increase in the area of the jet-nozzle 15 nor the supply of fuel to the main fuel injectors 40 can be effected until combustion of the pilot fuel has been initiated, so that the arrangement has the advantage that no loss of thrust by opening of the nozzle can occur should for any reason the pilot fuel fail to ignite. Furthermore, as the nozzle area increases so the supply of fuel to the main fuel injectors increases so that the operation of increasing the effective area of the nozzle does not result in any loss of thrust.

Referring to Figure 6, there is illustrated an arrangement which is suitable for use where an aircraft is powered by two or more engines. In a multiple engine installation, it is undesirable, especially where the engines are disposed outboard of the fuselage of the aircraft, to augment the thrust developed by any engine, for instance by heating the exhaust in the jet pipe, without simultaneously increasing the thrust developed by another engine, for example one disposed on the opposite side of the fuselage to the first-mentioned engine. The arrangement illustrated in Figure 6 is such as to prevent fuel being supplied to the main injectors 40 of one engine, even though the fuel being supplied by the associated pilot injector 42 has been ignited, unless the pilot supply to another engine has also been ignited. The arrangement is such that the temperature-sensitive devices 36, associated with the pilot injectors of the two engines, each have to sense a rise of temperature due to burning of fuel delivered by the associated pilot burners before a circuit 38b comprising the coils 35b is completed to energize the coils and permit the supply of fuel to the main injectors 40 of the two engines. In the arrangement shown, each of the temperature-sensitive devices 36 is associated with a polarized relay 37 and the circuit 38b comprises the relay contacts of both relays 37 connected in series, so that unless both relays 37 are operated by their associated temperature-sensitive devices 36 the circuit 38b cannot be completed. A similar arrangement can be adopted to ensure simultaneous retraction of the rocking segments 15a of a number of variable area nozzles.

For the purpose of ground test, and for emergency operation override switching gear 70 may be provided to permit the selection of exhaust heating of any one engine independently of the rest. In one position of the switching gear 70, the one solenoid 35b is connected to the battery. The switching gear 70 also has a position in which neither solenoid 35b is connected to the battery through the switching gear. In this manner, the fuel supply to the main injector systems of all engines can be arranged to take place simultaneously under normal operational use, whilst the override switching gear permits individual selection under particular circumstances.

We claim:

1. In a fuel-system for supplying fuel to a jet-pipe of gas-turbine engines and the like to heat exhaust gas in the jet-pipe, which jet-pipe has a jet-nozzle of variable effective area, and which fuel-system is of the class comprising at least one main fuel injector and a pilot fuel injector arranged so that the flame produced by burning of fuel delivered by the pilot injector ignites the fuel delivered by the main fuel injector, control means comprising first temperature-sensitive means arranged to be sensitive to a rise in temperature due to burning of fuel delivered by the pilot fuel injector, means controlled by said temperature-sensitive means to vary the effective area of said jet-nozzle in the sense of increasing the effective area of the jet-nozzle on sensing by the temperature-sensitive means of a rise in temperature due to burning of fuel delivered by the pilot injector, second temperature-sensitive means arranged in the jet-pipe to be sensitive to exhaust gas temperature upstream of said main fuel injector, a throttle adjustable to control the flow of fuel to said main fuel injector, and means arranged to adjust said throttle and connected with said second temperature-sensitive means to be controlled thereby to open said throttle on decrease of the exhaust gas temperature following an increase in the effective area of the jet-nozzle.

2. For use with an aircraft powered by a plurality of gas-turbine engines or the like, having each a jet-pipe and a variable-area jet-nozzle at the outlet from the jet-pipe and each having a fuel-system for supplying fuel to the jet-pipe to heat exhaust gas therein of the class comprising at least one main fuel injector and a pilot fuel injector arranged so that burning of fuel from the pilot fuel injector ignites the fuel from the main fuel injector, control means comprising a plurality of temperature-sensitive means, one associated with each pilot fuel injector to be sensitive to a rise of temperature due to burning of fuel delivered by said pilot fuel injector, valve means to control the supply of fuel to the main fuel injectors, and means to adjust the effective area of each jet-nozzle, said valve means and said means to adjust the effective area of the jet-nozzles being arranged to be controlled by said plurality of temperature-sensitive means to be inoperative respectively to permit the supply of fuel to the main fuel injectors and to increase the effective area of the jet-nozzles until each said temperature-sensitive means has sensed a rise of temperature due to burning of fuel delivered by its associated pilot fuel injector.

3. A gas-turbine engine comprising a jet pipe and combustion equipment in said jet pipe for reheating exhaust gas therein, a fuel system for supplying fuel to said combustion equipment having at least one main fuel injector and a pilot fuel injector arranged so that burning of fuel delivered through the pilot injector ignites the fuel from the main fuel injector, a temperature-sensitive device located to be subjected to the temperature rise due to burning of fuel delivered by the pilot injector, valve means to control delivery of fuel to the main fuel injector, control means comprising a first electrical device to actuate said valve means, a first electric circuit including a current source connected with said electrical device and a relay device connected to the temperature-sensitive device to be operated thereby and with said electric circuit to control the supply of electric current from said source to said electrical device whereby said valve means is opened on sensing by said temperature-sensitive device of a rise in temperature, a variable-area nozzle for said jet pipe, means for varying the area of the nozzle including a piston-and-cylinder ram device connected to said nozzle, a pressure fluid source, servo means for supplying pressure fluid from said source alternatively to the ends of the cylinder of said piston-and-cylinder device including a second electrical device, a second electric circuit including a current source connected with said second electrical device, said relay device being connected with said second electric circuit to control the supply of pressure fluid to said piston-and-cylinder device, whereby the area of said variable-area nozzle is increased on sensing by said temperature-sensitive device of a rise in temperature.

4. A gas-turbine engine comprising a jet pipe and combustion equipment in said jet pipe for reheating exhaust gas, a fuel system for supplying fuel to said combustion equipment having at least one main fuel injector and a pilot fuel injector arranged so that burning of fuel delivered through the pilot injector ignites the fuel from the main fuel injector, a temperature-sensitive device located to be subjected to the temperature rise due to burning of fuel delivered by the pilot injector, valve means to control delivery of fuel to the main fuel injector, a variable-area nozzle for said jet pipe, and control means comprising an electrical device to actuate said valve means, an electric circuit including a current source connected with said electrical device, a pair of contacts connected in said electric circuit, a tappet to operate said contacts, a piston and cylinder ram device of which the piston carries said tappet and is connected to adjust the area of said variable-area nozzle, a source of pressure fluid, servo means for supplying pressure fluid alternatively to the ends of the cylinder of said piston and cylinder ram device whereby the contacts and said variable-area nozzle are adjusted, the contacts being closed during opening of the variable-area nozzle, and a relay device connected with the temperature-sensitive device to be operated thereby and arranged to control said servo means, whereby said variable-area nozzle is opened on sensing by said temperature-sensitive device of a rise in temperature, and whereby during opening of said nozzle the valve means is opened.

5. A gas-turbine engine comprising a jet pipe and combustion equipment in said jet pipe for reheating exhaust gas, a fuel system for supplying fuel to said combustion equipment having at least one main fuel injector and a pilot fuel injector arranged so that burning of fuel delivered through the pilot injector ignites the fuel from the main fuel injector, a first temperature-sensitive device located to be subjected to the temperature rise due to burning of fuel delivered by the pilot injector, valve means to control delivery of fuel to the main fuel injector, and control means comprising reversible motor means to actuate said valve means, a first electric circuit including a current source connected with said reversible motor means, a second temperature-sensitive device located in the exhaust gas stream in the jet pipe upstream of said fuel injectors, a first relay device connected with the second temperature-sensitive device and with said first electric circuit to control the supply of electric current from said source to said reversible motor means, a variable area nozzle for said jet pipe whereby an increase of area of the nozzle results in a fall in temperature of the exhaust gas stream, means for varying the area of the nozzle including a piston and cylinder ram device connected to said nozzle, a pressure fluid source, servo means for supplying pressure fluid from said source alternatively to the ends of the cylinder of said piston and cylinder ram device including an electrical device, a second electric circuit including a current source connected with said electrical device, and a second relay device connected with the first temperature-sensitive device to be operated thereby and with said second electric circuit to control the supply of pressure fluid to said piston-and-cylinder device, whereby said valve means is opened on sensing by said second temperature-sensitive device of a fall in temperature of the exhaust gas stream due to increase of area of the variable-area nozzle resulting from the sensing by said first temperature-sensitive device of a rise in temperature.

6. A gas-turbine engine comprising a jet-pipe and combustion equipment in said jet-pipe for reheating exhaust gas flowing in the jet-pipe, a fuel system for supplying fuel to said combustion equipment having at least one main fuel injector and a pilot fuel injector arranged so that burning of fuel delivered through the pilot injector ignites the fuel from the main fuel injector, temperature-sensitive means located to be subjected to the temperature rise due to burning of fuel delivered by the pilot injector, a variable-area jet nozzle, valve means to control delivery of fuel to the main fuel injector, and means to increase the area of said jet nozzle and, at the earliest, simultaneously to open said valve means on sensing by said temperature-sensitive means of a temperature rise due to burning of fuel delivered by the pilot injector.

7. A gas-turbine engine comprising a jet-pipe and combustion equipment in said jet-pipe for reheating exhaust gas, a fuel system for supplying fuel to said combustion equipment having at least one main fuel injector and a pilot fuel injector arranged so that burning of fuel delivered through the pilot injector ignites the fuel from the main fuel injector, temperature-sensitive means located to be subjected to the temperature rise due to burning of fuel delivered by the pilot injector, a variable-area jet nozzle, means to increase the area of said jet nozzle on sensing by said temperature-sensitive means of a temperature rise due to burning of fuel delivered by the pilot injector, valve means to control delivery of fuel to the main fuel injector, and means actuated on increase of area of said nozzle to operate said valve means to permit delivery of fuel to the main fuel injector.

8. A gas-turbine engine as claimed in claim 7 having said means which is actuated on increase of area of said nozzle to operate said valve means, comprising reversible motor means to actuate said valve means, a first electric circuit including a current source connected with said reversible motor means, a temperature-sensitive device located in the exhaust gas stream in the jet-pipe upstream of said fuel injectors thereby to sense a fall in temperature of the exhaust gas stream when said variable-area jet-nozzle is increased in area; and a first relay device connected with the temperature-sensitive device located in the exhaust gas stream in the jet pipe upstream of the fuel injectors and with said first electric circuit to control the supply of electric current from said source to said reversible motor means and having said means to increase the area of the jet-nozzle comprising a piston and cylinder ram device connected to said nozzle, a pressure fluid source, servo means for supplying pressure fluid from said source alternatively to the ends of the cylinder of said piston and cylinder ram device, said servo means including an electrical device, a second electric circuit including a current source connected with said electrical device, and a second relay device connected with said temperature-sensitive means which is located to be subjected to the temperature rise due to burning of fuel delivered by the pilot injector, whereby said second relay device is operated on sensing of said temperature rise, and said second relay device being also connected with said second electric circuit to control the supply of pressure fluid to said piston and cylinder ram device, whereby said valve means controlling the delivery of fuel to the main fuel injector is opened following sensing by said temperature-sensitive means of a rise of temperature due to burning of pilot fuel.

9. A gas-turbine engine comprising a jet-pipe and combustion equipment in said jet-pipe for reheating exhaust gas flowing in the jet-pipe, a fuel system for supplying fuel to said combustion equipment having at least one main fuel injector and a pilot fuel injector arranged so that burning of fuel delivered through the pilot injector ignites the fuel from the main fuel injector, temperature-sensitive means located to be subjected to the temperature rise due to burning of fuel delivered by the pilot injector, a variable-area jet nozzle, valve means to control delivery of fuel to the main fuel injector, and means to cause opening of said valve means and to initiate an increase of area of said jet-nozzle not later than simultaneously with the opening of said valve means on sensing by said temperature-sensitive means of a temperature rise due to burning of fuel delivered by the pilot injector.

10. A gas-turbine engine comprising a jet-pipe and combustion equipment in said jet-pipe for reheating exhaust gas, a fuel system for supplying fuel to said combustion equipment having at least one main fuel injector and a pilot fuel injector arranged so that burning of fuel delivered through the pilot fuel injector ignites the fuel from the main fuel injector, temperature-sensitive means located to be subjected to the temperature rise due to burning of fuel delivered by the pilot injector, a variable-area jet-nozzle, and means to increase the area of said jet-nozzle on sensing by said temperature-sensitive means of a temperature rise due to burning of fuel delivered by the pilot injector.

References Cited in the file of this patent

UNITED STATES PATENTS

| | | |
|---|---|---|
| 1,625,630 | Scott | Apr. 19, 1927 |
| 1,879,186 | Goddard | Sept. 27, 1932 |
| 2,114,446 | Hildebrecht | Apr. 19, 1938 |
| 2,132,057 | Thornbery et al. | Oct. 4, 1938 |
| 2,165,555 | Kronmiller et al. | July 11, 1939 |
| 2,418,867 | Burch | Apr. 15, 1947 |
| 2,520,961 | Ray | Sept. 5, 1950 |
| 2,528,134 | Goddard | Oct. 31, 1950 |
| 2,538,642 | Gardiner et al. | Jan. 16, 1951 |
| 2,592,110 | Berggren et al. | Apr. 8, 1952 |

FOREIGN PATENTS

| | | |
|---|---|---|
| 919,004 | France | Feb. 25, 1947 |
| 572,724 | Great Britain | Oct. 22, 1945 |
| 612,414 | Great Britain | Nov. 12, 1948 |